(12) United States Patent
Agrawal et al.

(10) Patent No.: US 12,463,917 B2
(45) Date of Patent: Nov. 4, 2025

(54) PATH SELECTION FOR PACKET TRANSMISSION

(71) Applicant: Intel Corporation, Santa Clara, CA (US)

(72) Inventors: Anurag Agrawal, Santa Clara, CA (US); John Andrew Fingerhut, Cary, NC (US); Xiaoyan Ding, Lantau Island (HK); Song Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 18/503,851

(22) Filed: Nov. 7, 2023

(65) Prior Publication Data

US 2024/0080276 A1    Mar. 7, 2024

Related U.S. Application Data

(63) Continuation of application No. 17/550,938, filed on Dec. 14, 2021.

(51) Int. Cl.
| | |
|---|---|
| *H04L 47/628* | (2022.01) |
| *H04L 45/24* | (2022.01) |
| *H04L 49/00* | (2022.01) |

(52) U.S. Cl.
CPC ............ *H04L 47/628* (2013.01); *H04L 45/24* (2013.01); *H04L 49/3063* (2013.01)

(58) Field of Classification Search
None
See application file for complete search history.

(56) References Cited

U.S. PATENT DOCUMENTS

| | | | |
|---|---|---|---|
| 8,199,764 B2 | 6/2012 | Hoffman et al. | |
| 9,356,956 B2* | 5/2016 | Kruglick | H04L 63/02 |
| 10,306,513 B2* | 5/2019 | Bartfai-Walcott | H04L 41/0896 |
| 10,652,115 B1* | 5/2020 | Chen | H04L 43/024 |
| 12,212,495 B2* | 1/2025 | Vegesna | H04L 12/4633 |
| 12,231,353 B2* | 2/2025 | Goel | H04L 47/41 |

(Continued)

OTHER PUBLICATIONS

"Definition weighted fair queueing (WFQ)", TechTarget Contributor, <https://www.techtarget.com/searchnetworking/definition/weighted-fair-queueing>, Aug. 2006, 3 pages.

(Continued)

*Primary Examiner* — Eunsook Choi
(74) *Attorney, Agent, or Firm* — Essential Patents Group, LLP; Christopher K. Gagne

(57) ABSTRACT

Examples described herein relate to a network interface device comprising a multi-stage programmable packet processing pipeline circuitry to determine a path to transmit a packet based on relative network traffic transmitted via multiple paths. In some examples, determine a path to transmit a packet is based on Deficit Round Robin (DRR). In some examples, the programmable packet processing pipeline circuitry includes: a first stage to manage two or more paths, wherein a path of the two or more paths of the first stage is associated with two or more child nodes, a second stage to manage two or more paths, wherein a path of the two or more paths of the second stage is associated with two or more child nodes, and at least one child node is associated with the determined path.

48 Claims, 8 Drawing Sheets

(56) References Cited

U.S. PATENT DOCUMENTS

| | | | | |
|---|---|---|---|---|
| 2006/0029079 A1* | 2/2006 | Cohen | .................. | H04L 47/263 |
| | | | | 370/395.4 |
| 2017/0111283 A1* | 4/2017 | Kumar | .................. | H04L 47/24 |
| 2020/0092209 A1* | 3/2020 | Chen | ....................... | H04L 41/40 |
| 2021/0297350 A1* | 9/2021 | Vegesna | .................. | H04L 47/12 |
| 2025/0005842 A1* | 1/2025 | Fujieda | .................. | G06T 15/06 |

OTHER PUBLICATIONS

"P4-programmable Ethernet switch ASIC that delivers better performance at lower power", <https://www.intel.com/content/www/us/en/products/network-io/programmable-ethernet-switch/tofino-series.html>, Jun. 2019.

"Technical Specifications", <https://people.ucsc.eu/-warner/bufs/barefoot2.html>, Dec. 2019, 2 pages.

Shreedhar, M., et al., "Efficient Fair Queuing using Deficit Round Robin", IEEE/ACM Transactions on Networking, vol. 4, No. 3, Jun. 1996, 11 pages.

Non-Final Office Action from U.S. Appl. No. 17/550,938 notified Jan. 15, 2025, 16 pgs.

Notice of Allowance from U.S. Appl. No. 16/410,805 notified Oct. 8, 2020, 9 pgs.

Notice of Allowance from U.S. Appl. No. 17/550,938 notified May 21, 2025, 11 pgs.

* cited by examiner

PATH SELECTION FOR PACKET TRANSMISSION

CLAIM OF PRIORITY

This application is a continuation of prior co-pending U.S. patent application Ser. No. 17/550,938, filed Dec. 14, 2021 and titled "PATH SELECTION FOR PACKET TRANSMISSION," which claims the benefit of priority to PCT Application No. PCT/CN2021/129747 filed Nov. 10, 2021 and titled "DEFICIT ROUND ROBIN PACKET BASED LOAD BALANCE WITH P4." Each of the aforesaid prior Patent Applications is hereby incorporated herein by reference in its entirety.

BACKGROUND

Internet technologies rely on networking to provide communication among devices. A switch is a network interface device that forwards packets to other destinations. A switch faces challenges of load balancing packets transmitted from a limited number of egress paths with limited bandwidth. Link aggregation combines multiple network connections to increase throughput beyond what a single connection could provide and provide redundancy should a link. A link aggregation group (LAG) is a combined collection of physical ports. Equal-cost multipath (ECMP) separates traffic with the same source and destination across multiple paths. ECMP and LAG are widely used for flow-based load balancing between connected network devices by logical or physical links in network applications, such as top of rack (TOR) or leaf-spine infrastructures.

However, in some networks, such as a Clos network, flow-based load balancing between network interface cards within a chassis may lead to performance issues. Hashing of packets for flow recognition can lead to collisions, whereby different flows are treated the same, which can possibly lead to packet drop due to insufficient networking resources. A packet drop caused by a collision can be significant in the presence of elephant flows. To tolerate packet drops caused by hashing collision, bandwidth speed up can be used for the links between line cards and crossbar.

DETAILED DESCRIPTION

Figure 1:
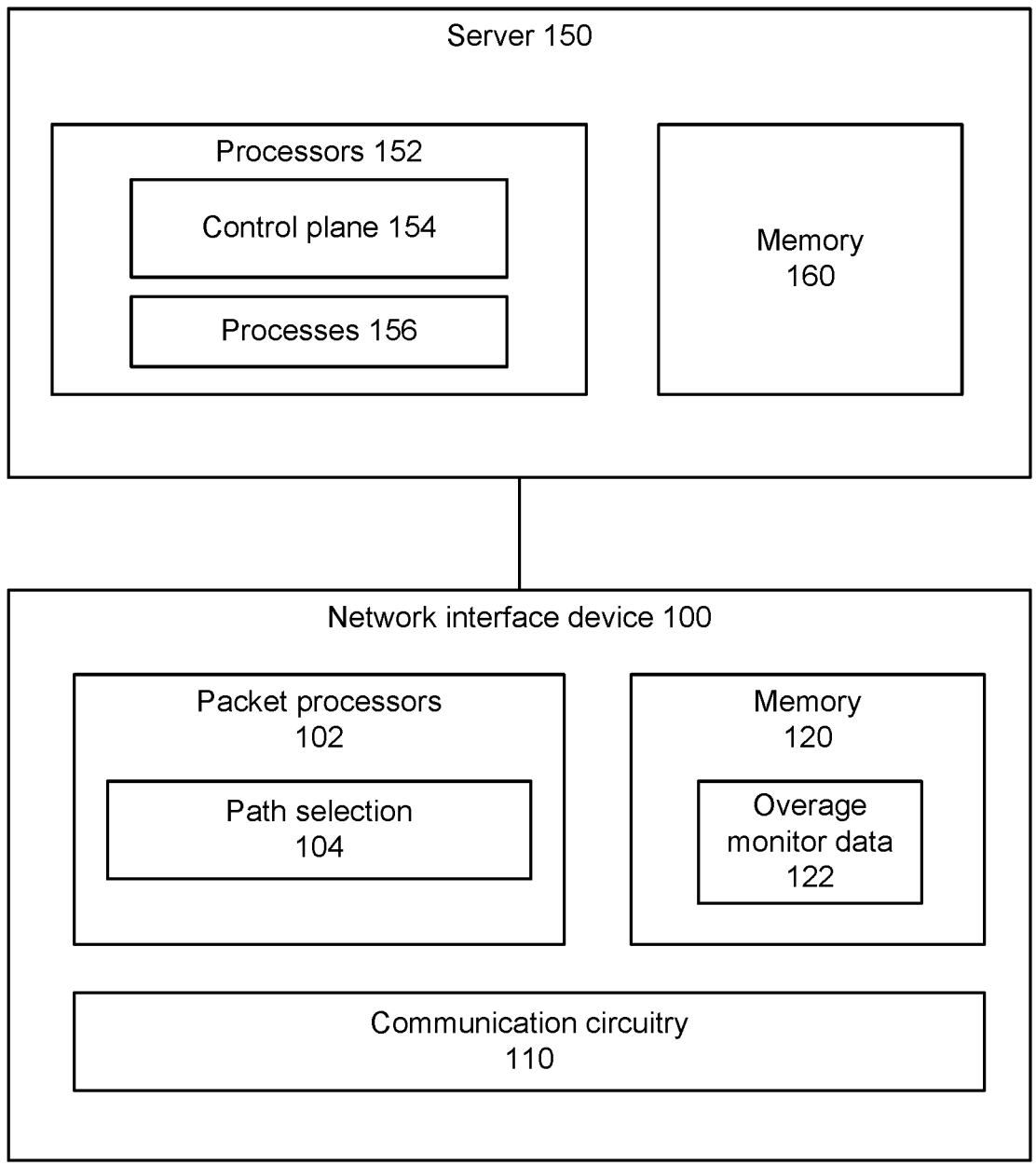
FIG. 1 depicts an example system.

In a network interface device, Deficit Round Robin (DRR) is a manner of scheduling packets for transmission. DRR allows N number of bytes per path to be transmitted before selecting a next path to use to transmit a packet. In a network interface device, some examples utilize DRR or other techniques to distribute packets to different paths but account for overages in a prior path selection when selecting a path. Some examples attempt to distribute transmitted bytes approximately equally among paths, however, distribution of bytes can be uneven where a path is provided with more bytes per transmit window than one or more other paths. In some examples, a path can represent a physical or logical port or a link or connection associated with a set of tuples. In some examples, a port can be associated with multiple paths. In some examples, a path can be associated with one or more virtual destinations. For example, one or more destination addresses can be associated with a port.

For example, if a path is selected to egress a packet, and an allocation of bytes to the path (e.g., bucket size) is exceeded by a size of the packet allocated for egress, the overage above the allocation can be stored. In a subsequent allocation of a packet to an egress path, the overage can be considered in selecting an alternate path to attempt to maintain an approximately even distribution of bytes transmitted across different paths over time. Egress packet length can differ in sizes, and some examples track a number of bytes over a byte allocation to a path per-packet or group of packets.

Some examples, divide packet selection into 2 paths, e.g., left path and right path, where a path includes one or more child nodes and a node can represent a collection of paths or a path. Some examples utilize power-of-2 trees to track overages (or negative overages) among groups of two paths to provide for reduced complexity and meta-data size in connection with attempting to provide approximately even transmit rate among multiple paths.

Some examples of a network interface device include fixed or programmable packet processing pipelines configured to track overages associated with a transmit window. A packet processing pipeline can include multiple stages and implement deficit round robin using a feedforward architecture. In some examples, a feedforward architecture can be implemented as a multiple-stage packet processing pipeline with serial data processing by match-action units. A packet processing stage can maintain transmitted bytes for two paths, even if a path includes multiple child nodes. For example, at a first stage, a decision of which path to use to transmit a packet can be fed forward to a second, subsequent stage and the second stage can select a path based on information provided by the first stage. Some examples can support selection of a path among $2^n$ paths, where $n \geq 1$, using multiple registers or arrays of data. Some examples can support even or uneven distribution of bandwidth over multiple paths.

Accordingly, load-balancing according to DRR can be achieved using a programmable or fixed function data-plane to provide load balancing among paths.

FIG. 1 depicts an example system. Network interface device 100 can include one or more of: network interface controller (NIC), a remote direct memory access (RDMA)-enabled NIC, SmartNIC, router, switch, forwarding element, infrastructure processing unit (IPU), data processing unit (DPU), network-attached appliance (e.g., storage, memory, accelerator, processors, security), memory pooled switch, Compute Express Link (CXL) switch, core router, carrier Ethernet core, data center top of rack (ToR), leaf-spline infrastructure, and so forth.

Packet processors 102 can determine which port to transfer packets or frames to using a table that maps packet header or other characteristics with an associated output port. Packet processors 102 can be configured to perform match-action on received packets to identify packet processing rules and next hops using information stored in a ternary content-addressable memory (TCAM) tables or exact match tables in some examples. For example, match-action tables or match-action unit (MAU) circuitry can be used whereby a hash of a portion of a packet is used as an index to find an entry. Configuration of operation of packet processors 102, including its data plane, can be programmed using Programming Protocol-independent Packet Processors (P4), C, Python, Broadcom Network Programming Language (NPL), or x86 compatible executable binaries or other executable binaries.

For example, packet processors 102 can be configured to perform path selection 104. A path can include a port or virtual entity such as a IPv4 or IPv6 destination address. In some examples, a match action unit can perform path selection 104. Path selection 104 can select a link or port for a packet to be transmitted. For example, path selection 104 can perform link or port selection based on DRR. In some examples, DRR may allocate packets of a flow exit to different paths. Based on overage monitor data 122, path selection 104 can attempt to distribute bytes within a scheduled transmit window according to an amount of bytes allocated to a link or port. For example, packet sizes can be varying sizes and if a number of bytes allocated for transmission in a first transmit window is over or under an allocated amount of bytes permitted for allocated for transmission in the first transmit window to a node, overage monitor data 122 can record either a positive or negative number of bytes with respect to the allocated amount of bytes. In some examples, packet processors 102 can apply ECMP and/or LAG for flow-based load balancing after application of DRR.

Packet processors 102 can access congestion metrics to select a path based on ECMP and/or LAG. In some examples, congestion metrics can be conveyed in metadata of in-band telemetry schemes such as those described in: "In-band Network Telemetry (INT) Dataplane Specification, v2.0," P4.org Applications Working Group (February 2020); IETF draft-lapukhov-dataplane-probe-01, "Data-plane probe for in-band telemetry collection" (2016); and IETF draft-ietf-ippm-ioam-data-09, "In-situ Operations, Administration, and Maintenance (IOAM)" (Mar. 8, 2020).

A node can be associated with two branches, where a branch can be associated with one or more nodes or paths and a path can represent a link, connection, or port. If there is no overage or underage, and the number of bytes allocated for transmission in the first window matches the allocated amount of bytes permitted for allocated for transmission in the first transmit window, overage monitor data 122 can record a value of zero. In a second, subsequent, transmit window, path selection 104 can consider overage monitor data 122 in selecting a node among a pair of nodes whereby a node other than a node with an associated positive overage is selected. For example, if a node 0 is associated with branches of nodes 1 and 2 and positive overage data is associated with node 0 for the first window, then during the first window, node 1 received more than an allocated amount of bytes. During a second window, path selection 104 can select node 2 to attempt to balance an amount of bytes allocated for transmission among then nodes 1 and 2. A node can be associated with two branches where a branch includes other nodes or paths, and path selection 104 can traverse branches to select a path.

A packet in a flow can include a same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. In some examples, a flow can have its own time domain relative to main timer or other clock sources.

Communication circuitry 110 can provide communications with other devices over a network or fabric via one or more ports. Communication circuitry 110 can be configured to use any one or more communication technology (e.g., wired or wireless communications) and associated protocols (e.g., Ethernet, InfiniBand®, Bluetooth®, Wi-Fi®, 4G LTE, 5G, etc.) to perform such communication. Communication circuitry 110 can include one or more network hardware resources, such as ingress queues, egress queues, crossbars, shared memory switches, media access control (MAC), physical layer interface (PHY), Ethernet port logic, and other network hardware resources.

Memory 120 can be configured to store packets received at ports prior to egress from one or more ports. Memory 120 can store overage monitor data 122 and other data used for connection maintenance and packet transmission or receipt.

Server 150 can cause transmission of packets using network interface device 100. For example, processors 152 can execute control plane 154 to configure packet processors 102 to perform path selection as described herein. In addition, processors 152 can execute processes 156. Processes 156 can be embodied as one or more of: an application, virtual machine (VM), container, microservice, serverless application, network interface device, accelerator, processor, and so forth. Note that application, virtual machine (VM), container, microservice, serverless application, network interface device, accelerator, and processor can be used interchangeably. Processes 156 can cause transmission of packets using network interface device 100 to another device. Memory 160 can store data utilized by processes 156 and other data used in connection with packet transmission and receipt.

Processes 156 can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in ETSI specifications or Open Source NFV MANO from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some applications can perform video processing or media transcoding (e.g., changing the encoding of audio, image or video files).

Figure 2:
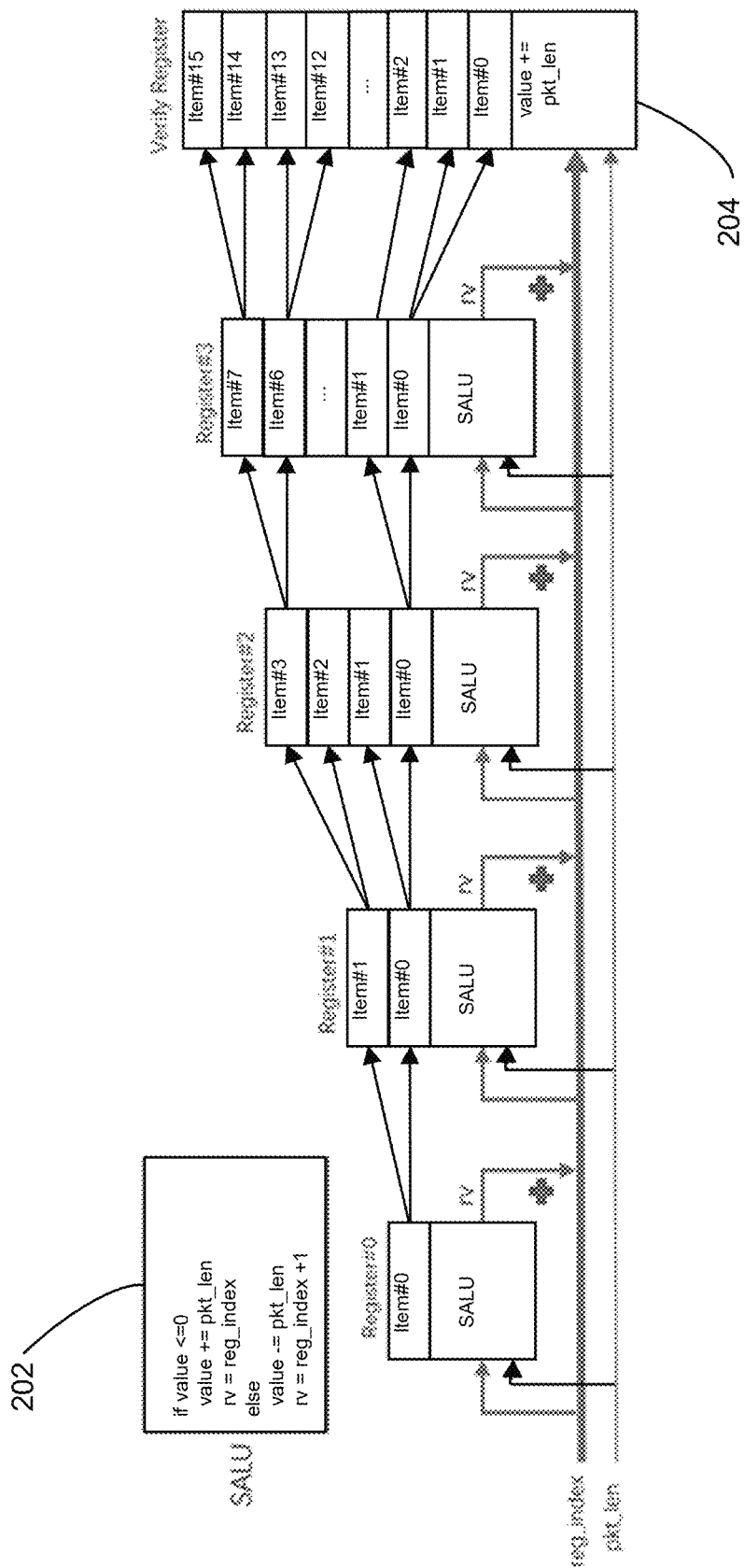
FIG. 2 depicts an example system.

FIG. 2 depicts an example system. This system provides an example of 16 paths with a tree with nodes 0 to 3. Stateful arithmetic logic units (ALUs) can perform pseudocode 202 based on overage values stored in a corresponding register. A register can store an array of integer values that can be read or write. For example, an SALU can update an overage value stored in a register. An SALU can be part of a match action unit (MAU) of a packet processing pipeline.

For example, for a node 0, Item #0 stored in Register #0 can represent an overage value with respect to left and right child nodes. For example, for a node 1, Item #1 stored in Register #1 can represent an overage value with respect to left and right child nodes of node 1. For example, for a node 2, Items #2 and 3 stored in Register #2 can represent overage values with respect to four child nodes of node 2. For example, for a node 3, Items #4- #7 stored in Register #3 can represent overage values with respect to four child nodes of node 3. Verify registers 204 can represent a selection of a path.

A register can be used to select 1 of 2 paths and n registers can be cascaded to select 1 of $2^n$ paths. A register can perform arithmetic, compare, and logical operations, and save the result. For example, a register can calculate sent bytes and generate a path index according to the current overage of the path. Prior to a packet transmission or at an initial time, a register value is zero. When a first packet is to be transmitted, the register selects the left path and includes the size of the sent packet in the register value (overage).

Figure 3:
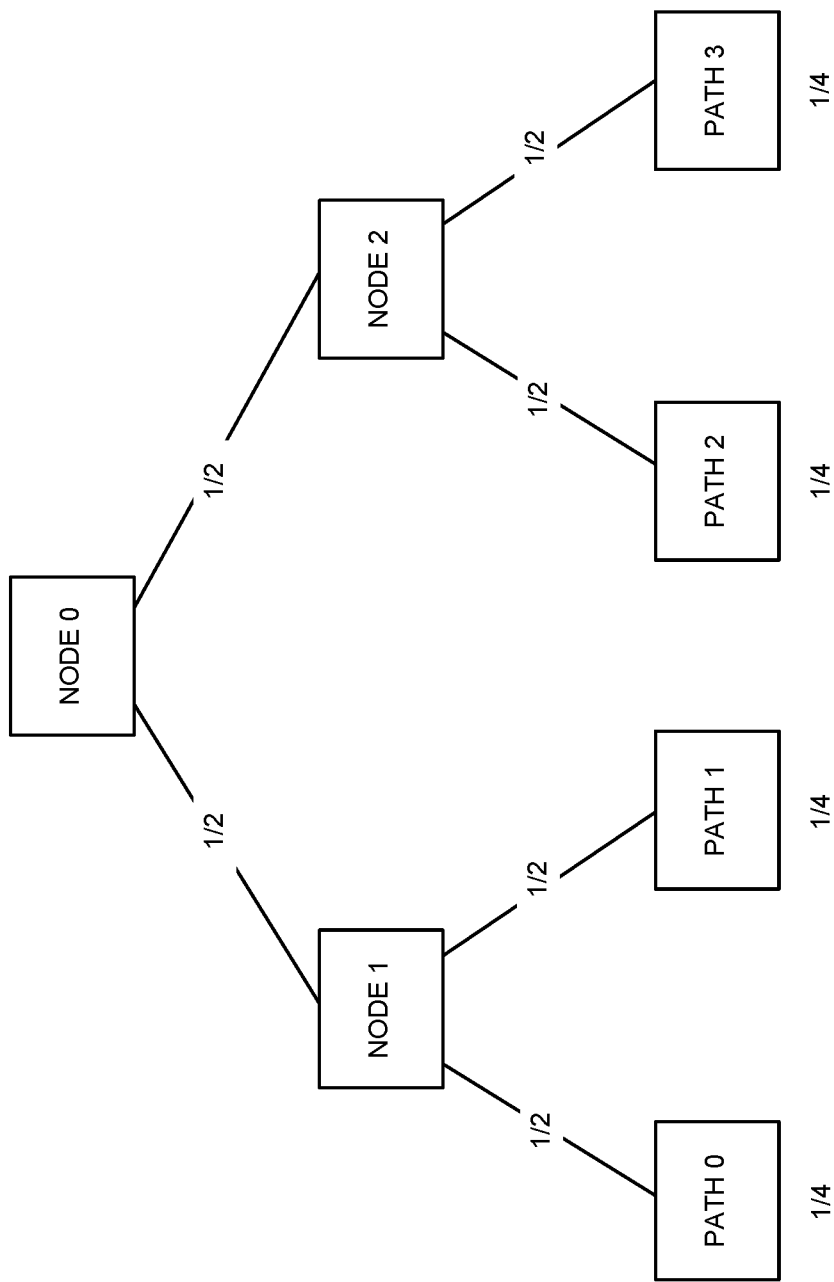
FIG. 3 depicts an example of path selection using a tree.

FIG. 3 depicts an example of path selection. In some examples, multiple paths are available for selection to transmit a packet by traversing a tree and bandwidth allocated to the paths 0 to 3 are even at ¼ of bandwidth to each of paths 0 to 3. In the example of FIG. 3, a path among 4 paths is selected via a balanced binary tree. Node 0 can be a root node for node 1 and node 2. Node 1 is associated with paths 0 and 1 and node 2 is associated with paths 2 and 3. A state can be stored for node 0 that represents an extent that data, transmitted using a path associated with node 1 in a prior transmit window, is higher than an amount of data, transmitted using a path associated with node 2. Similarly, a state can be stored for node 1 that represents an extent that data, transmitted using path 0 in a prior transmit window, is higher than an amount of data transmitted using path 1. A state can be stored for node 2 that represents an extent that data, transmitted using path 2 in a prior transmit window, is higher than an amount of data transmitted using path 3. For a packet that is to be transmitted, selection of a path can be based on a node or path that is not associated with an overage.

For example, initially, an overage for node 0 is zero as no packets have been sent. In a first transmit window, for a 100 byte first packet that is to be transmitted, as there is no overage, either the left or right node (node 1 or node 2) can be selected. In some examples, a left node or path is chosen when an overage is zero. A state at node 0 can be updated to a 100 byte overage of node 1 over that of node 2. For node 1, initially, an overage is zero as no packets have been sent. In some examples, a left path is chosen when an overage is zero. A state at node 1 can be updated to a 100 byte overage of path 0 over that of node 2. Path 0 is selected to transmit the first packet.

In a second transmit window, for a second packet of 50 bytes, at node 0, an overage of 100 bytes of node 1 over that of node 2 leads to selection of node 2 to attempt to reduce the overage to closer to zero. For node 2, initially, an overage is zero as no packets have been sent. In some examples, a left path is chosen when an overage is zero and path 2 is selected to transmit the second packet. A state at node 2 can be updated to a 50 byte overage of path 2 over that of path 3. An overage measured for node 0 is reduced from 100 to 50 bytes to indicate an aggregate overage of 50 bytes to the left (e.g., node 1).

In a third transmit window, for a third packet of 100 bytes, at node 0, an overage of 50 bytes of node 1 over that of node 2 leads to selection of node 2 to attempt to reduce the overage to closer to zero. For node 2, an overage is 50 bytes as 50 more bytes have been sent through path 2 than that of path 3. Path 3 is selected to attempt to balance byte transmission among paths 2 and 3. A state at node 2 can be updated to a (−50) byte overage (or 50 byte underage) of path 2 over that of path 3. An overage measured for node 0 is reduced from 50 bytes to (−50) bytes to indicate an aggregate overage of (−50) bytes to the left (e.g., node 1).

In some examples, aggregate overage data for node 0 can be stored in a stage 0 of packet processing pipeline, aggregate overage data for nodes 1 and 2 can be stored in a stage 1 of packet processing pipeline, and aggregate overage data for paths 0 to 3 can be stored in a stage 2 of packet processing pipeline, where aggregate overage data of stage 0 is fed forward to a stage 1 and/or stage 2 and aggregate overage data of stage 1 is fed forward to a stage 2. Aggregate overage data can be fed forward in a packet or packet header or pointer to a memory region.

For example, the following provides pseudocode of a binary tree that can be performed to support an even number of balanced paths of the example of FIG. 3 to load balance packet transmission approximately equally over two nodes or paths over time.

```
// State maintained across processing of different packets
Signed int<32> diff;         // initialized to 0
// input
bit<14> pkt_len; // the length of the current packet in bytes,
        // in the range [1, MTU].
// output
bit<1> path;      // 0 for left, 1 for right
if (diff >= 0) {
    // more bytes sent to right path so far (or equal number)
    path = 0; // select left path
    diff = diff − (int<32>) pkt_len;
} else {
    // more bytes sent to left path so far
    path = 1; // select right path
    diff = diff + (int<32>) pkt_len;
}
```

Figure 4:
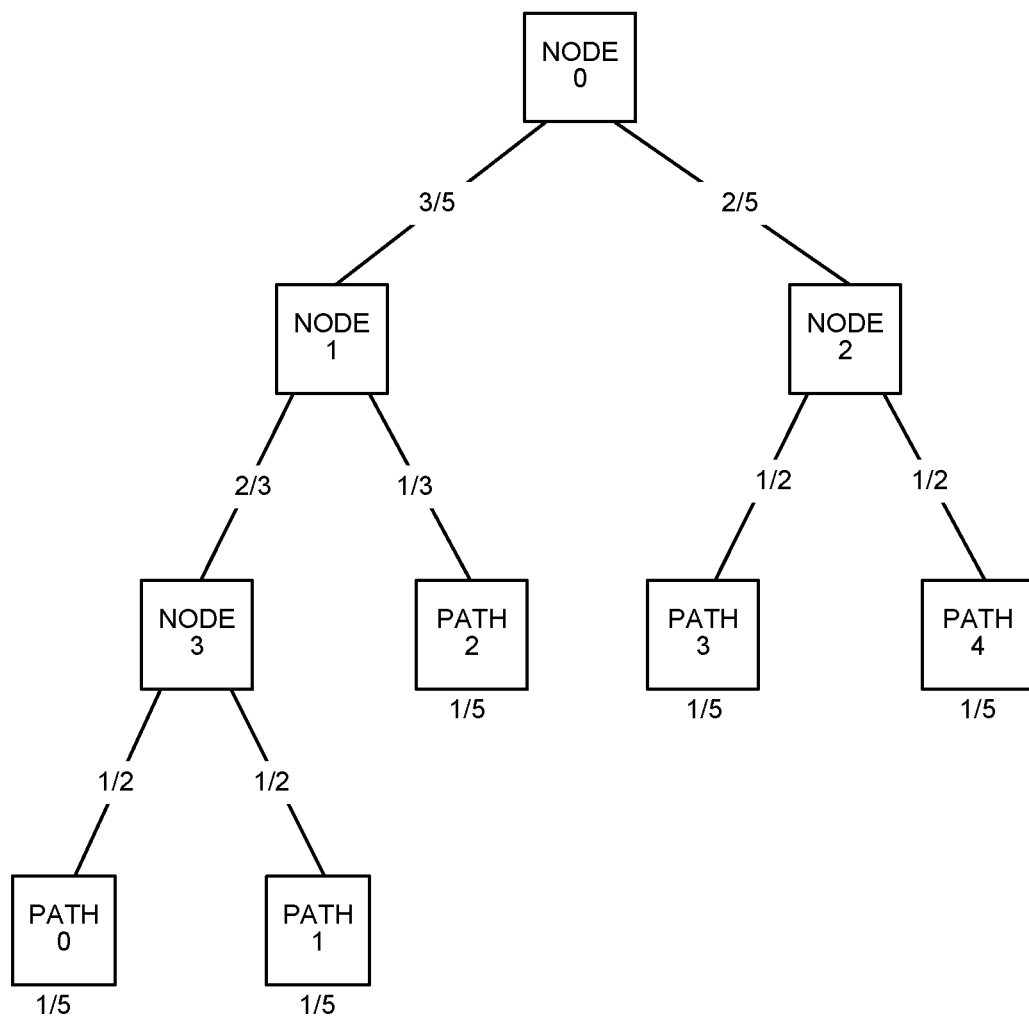
FIG. 4 depicts an example of path selection using a tree.

FIG. 4 depicts an example of path selection using a tree. In some examples, multiple paths are available for selection to transmit a packet by traversing a tree and bandwidth allocated to the paths 0 to 4 are even at ⅕ of bandwidth to each of paths 0 to 4. However, a path among 5 paths is selected via an unbalanced binary tree. In this example, 50% more traffic is sent to a left path over that of the right path. Other choices of multipliers allow selection of weights for how many bytes are sent to a left node or path versus right or path.

Node 0 can be a root node for node 1 and node 2. The root node, node 0, sends ⅗ of transmitted bytes to its left child node, node 1, and ⅖ of transmitted bytes to its right child, node 2. Node 1 is associated with node 3 and path 2. Node 3 receives ⅔ of the bytes allocated to node 1 whereas path 2 receives ⅓ of the bytes allocated to node 1. Node 3 is associated with paths 0 and 1. Path 0 receives ½ of the bytes allocated to node 3 and path 1 receives ½ of the bytes allocated to node 3.

Node 2 is associated with paths 3 and 4. Path 3 receives ½ of the bytes allocated to node 2 and path 4 receives ½ of the bytes allocated to node 2.

A state can be stored for node 0 that represents an extent that an amount of data, transmitted using a path associated with node 1 in a prior transmit window, is higher than an amount of data, transmitted using a path associated with node 2. On average, over time, node 1 can be allocated ⅗ of an amount of bytes allocated for transmission from node 0 whereas node 2 can be allocated ⅖ an amount of bytes allocated for transmission from node 0. Accordingly, a state at node 0 can be updated to indicate (#bytes sent to node 1*2)−(#bytes sent to node 2*3) to attempt to skew selection of a node that does not have an overage of transmitted bytes in a prior transmit window. Similarly, a state can be stored for node 1 that represents an extent that data, transmitted using node 3 (e.g., paths 0 and 1) in a prior transmit window, is higher than an amount of data transmitted using path 2. Similar states can be stored for nodes 2 and 3.

For example, initially, when no packets have been sent, an overage for node 0 is zero. In a first transmit window, for a 100 byte first packet that is to be transmitted, as there is no overage, either the left or right node (node 1 or node 2) can be selected. In some examples, a left node or path is chosen when an overage is zero. Node 1 can be allocated ⅗ times of an amount of bytes allocated for transmission from node 0 whereas node 2 can be allocated ⅖ an amount of bytes allocated for transmission from node 0. Accordingly, a state at node 0 can be updated to [(100 bytes sent to node 1*2)−(0 bytes sent to node 2*3)] to indicate a 200 byte overage of node 1 over that of node 2.

For node 1, initially, an overage is zero as no packets have been sent. In some examples, a left path is chosen when an overage is zero and node 3 is selected. However, a right path can be chosen instead. Node 3 can be allocated ⅔ times of an amount of bytes allocated for transmission from node 1 whereas path 2 can be allocated ⅓ an amount of bytes allocated for transmission from node 1. Accordingly, a state at node 0 can be updated to [(100 bytes sent to node 3*1)−(0 bytes sent to path 2*2)] to indicate a 100 byte overage of node 3 over that of path 2.

For node 3, initially, an overage is zero as no packets have been sent. In some examples, a left path (e.g., path 0) is chosen when an overage is zero. However, a right path can be chosen instead. Path 0 can be allocated ½ times of an amount of bytes allocated for transmission from node 3 whereas path 1 can be allocated ½ an amount of bytes allocated for transmission from node 3. A state at node 3 can be updated to [(100 bytes sent to path 0*1)−(0 bytes sent to path 1*1)] to indicate a 100 byte overage of path 0 over that of path 1.

In a second transmit window, for a second packet of 50 bytes, at node 0, an overage of 200 bytes of node 1 over that of node 2 leads to selection of node 2 to attempt to reduce the overage to closer to zero. The overage measured at node 0 of 200 is reduced by [(0 bytes sent to node 1*2)−(50 bytes sent to node 2*3)] to indicate a [200−150=50] byte overage of node 1 over that of node 2. Selecting node 2 reduces an overage of node 1 over node 2 in terms of transmitted bytes.

For node 2, initially, an overage is zero as no packets have been sent. In some examples, a left path is chosen when an overage is zero and path 3 is selected to transmit the second packet. Path 3 can be allocated ½ times of an amount of bytes allocated for transmission from node 2 whereas path 4 can be allocated ½ an amount of bytes allocated for transmission from node 2. A state at node 2 can be updated to [(50 bytes sent to path 3*1)−(0 bytes sent to path 4*1)] to indicate a 50 byte overage of path 3 over that of path 4.

In a third transmit window, for a third packet of 100 bytes, at node 0, an overage of 10 bytes of node 1 over that of node 2 leads to selection of node 2 to attempt to reduce the overage to closer to zero. The overage measured at node 0 of 50 is reduced by [(0 bytes sent to node 1*2)−(100 bytes sent to node 2*3)] to indicate a [50−300=−250] byte overage of node 1 over that of node 2, which is an underage. In a next transmit window, as there is an overage towards node 2, node 1 is to be selected.

For node 2, an overage is 50 bytes as 50 more bytes have been sent through path 3 than that of path 4. Path 4 is selected to attempt to balance byte transmission among paths 3 and 4. The overage measured at node 2 of 50 is reduced by [(0 bytes sent to path 3*1)−(100 bytes sent to path 4*1)] to indicate a [50−100=−50] byte overage of path 3 over that of path 4, which is an underage. In a next transmit window, as there is an overage towards path 4, path 3 is to be selected.

In some examples, aggregate overage data for node 0 can be stored in a stage 0 of packet processing pipeline, aggregate overage data for nodes 1 and 2 can be stored in a stage 1 of packet processing pipeline, and aggregate overage data for paths 0 to 3 can be stored in a stage 2 of packet processing pipeline, where aggregate overage data of stage 0 is fed forward to a stage 1 and/or stage 2 and aggregate overage data of stage 1 is fed forward to a stage 2. Aggregate overage data can be fed forward in a packet or packet header or pointer to a memory region.

For example, the following provides pseudocode of a binary tree can be performed to support an odd number of paths of the example of FIG. 4 to load balance packet transmission unequally over two nodes or paths, with options for what fraction of the bytes are sent to each node or path.

```
// State maintained across processing of different packets
int<32> diff;      // initialized to 0
// input
bit<14> pkt_len; // the length of the current packet in bytes,
        // in the range [1, MTU].
// output
bit<1> path;      // 0 for left, 1 for right
int<32> pkt_len_times_2;
int<32> pkt_len_times_3;
pkt_len_times_2 = ((int<32>) pkt_len) << 1;
pkt_len_times_3 = pkt_len_times_2 + ((int<32>) pkt_len);
if (diff >= 0) {
    path = 0; // select left path
    diff = diff − pkt_len_times_2;
} else {
    path = 1; // select right path
    diff = diff + pkt_len_times_3;
    }
```
Instead of "diff" being equal to "bytes_sent_right − bytes_sent_left", it will be equal to "3 * bytes_sent_right − 2 * bytes_sent_left". And instead of 'diff' always being in the range "[−MTU, +MTU]", it will always be in the range "[−2*MTU, +3*MTU]".
Whenever 'diff' becomes 0, it means:
    3 * bytes_sent_right − 2 * bytes_sent_left = 0)
which is equivalent to:
    (3/2) * bytes_sent_right = bytes_sent_left An MTU can represent a maximum transmission unit (MTU) or largest packet size.

Figure 5A:
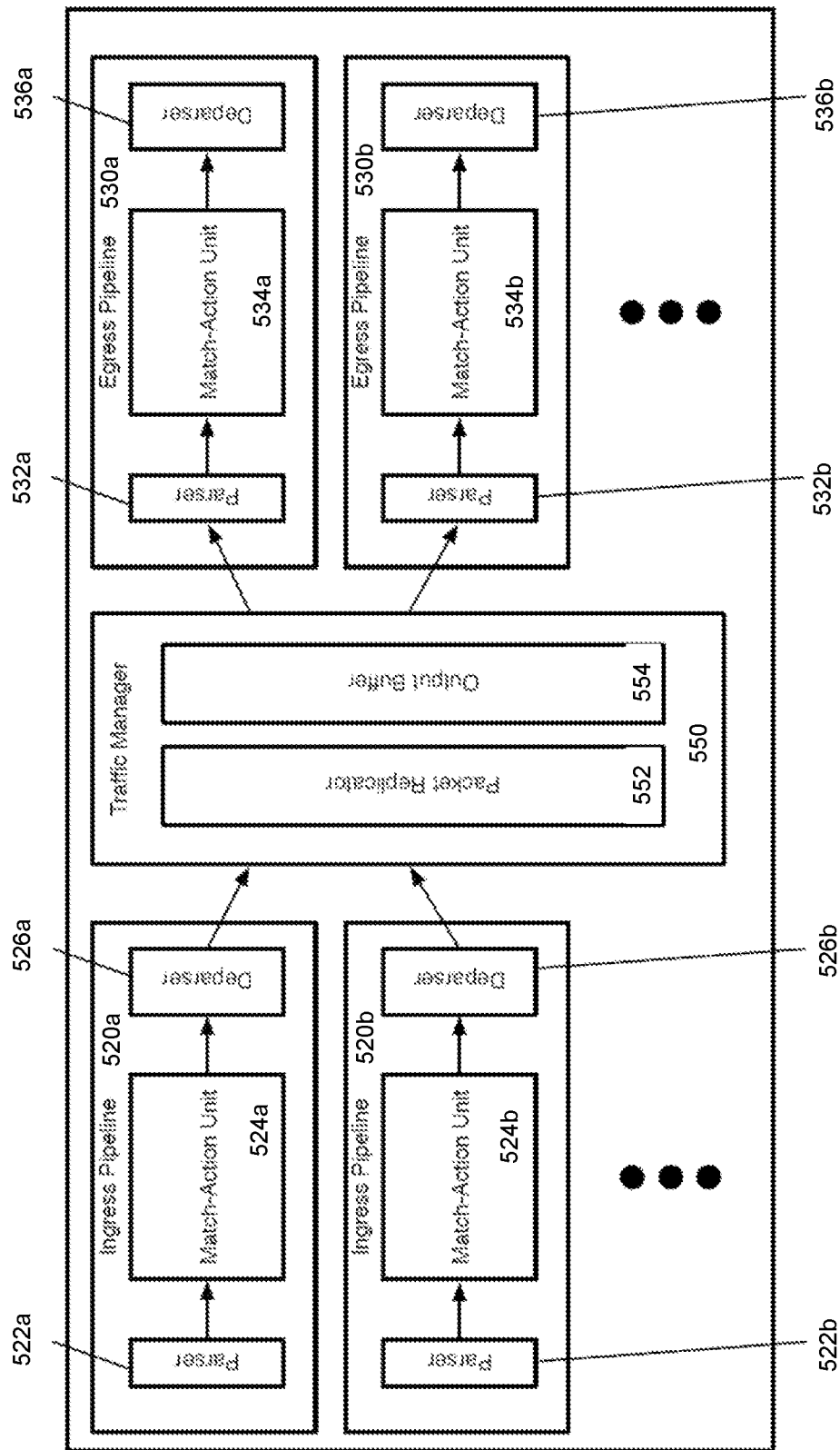
FIG. 5A depicts an example network interface device.

FIG. 5A depicts an example network forwarding system that can be used as a switch or router. For example, FIG. 5A illustrates several ingress pipelines 520, a traffic management unit (referred to as a traffic manager) 550, and several egress pipelines 530. Though shown as separate structures, in some examples the ingress pipelines 520 and the egress pipelines 530 can use the same circuitry resources. In some examples, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other examples, the ingress and egress pipelines are separate circuitry. In some of these other examples, the ingress pipelines also process the non-packet data.

In some examples, in response to receiving a packet, the packet is directed to one of the ingress pipelines 520 where an ingress pipeline which may correspond to one or more ports of a hardware forwarding element. After passing through the selected ingress pipeline 520, the packet is sent to the traffic manager 550, where the packet is enqueued and placed in the output buffer 554. In some examples, the ingress pipeline 520 that processes the packet specifies into which queue the packet is to be placed by the traffic manager 550 (e.g., based on the destination of the packet or a flow identifier of the packet). The traffic manager 550 then dispatches the packet to the appropriate egress pipeline 530 where an egress pipeline may correspond to one or more ports of the forwarding element. In some examples, there is no necessary correlation between which of the ingress pipelines 520 processes a packet and to which of the egress pipelines 530 the traffic manager 550 dispatches the packet. That is, a packet might be initially processed by ingress pipeline 520*b* after receipt through a first port, and then subsequently by egress pipeline 530*a* to be sent out a second port, etc.

A least one ingress pipeline 520 includes a parser 522, a chain of multiple match-action units (MAUs) 524, and a deparser 526. Similarly, egress pipeline 530 can include a parser 532, a chain of MAUs 534, and a deparser 536. The parser 522 or 532, in some examples, receives a packet as a formatted collection of bits in a particular order, and parses the packet into its constituent header fields. In some examples, the parser starts from the beginning of the packet and assigns header fields to fields (e.g., data containers) for processing. In some examples, the parser 522 or 532 separates out the packet headers (up to a designated point) from the payload of the packet, and sends the payload (or the entire packet, including the headers and payload) directly to the deparser without passing through the MAU processing. Egress parser 532 can use additional metadata provided by the ingress pipeline to simplify its processing.

The MAUs 524 or 534 can perform processing on the packet data. In some examples, the MAUs includes a sequence of stages, with a stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using MAU(s), of an ingress pipeline 520 or egress pipeline 530, selection of a path to transmit a packet can be performed based on a binary tree structure as described herein.

The deparser 526 or 536 can reconstruct the packet using the PHV as modified by the MAU 524 or 534 and the payload received directly from the parser 522 or 532. The deparser can construct a packet that can be sent out over the physical network, or to the traffic manager 550. In some examples, the deparser can construct this packet based on data received along with the PHV that specifies the protocols to include in the packet header, as well as its own stored list of data container locations for a protocol's header fields.

Traffic manager 550 can include a packet replicator 552 and output buffer 554. In some examples, the traffic manager 550 may include other components, such as a feedback generator for sending signals regarding output port failures, a series of queues and schedulers for these queues, queue state analysis components, as well as additional components. Packet replicator 552 of some examples performs replication for broadcast/multicast packets, generating multiple packets to be added to the output buffer (e.g., to be distributed to different egress pipelines).

The output buffer 554 can be part of a queuing and buffering system of the traffic manager in some examples. The traffic manager 550 can provide a shared buffer that accommodates any queuing delays in the egress pipelines. In some examples, this shared output buffer 554 can store packet data, while references (e.g., pointers) to that packet data are kept in different queues for an egress pipeline 530. The egress pipelines can request their respective data from the common data buffer using a queuing policy that is control-plane configurable. When a packet data reference reaches the head of its queue and is scheduled for dequeuing, the corresponding packet data can be read out of the output buffer 554 and into the corresponding egress pipeline 530. In some examples, packet data may be referenced by multiple pipelines (e.g., for a multicast packet). In this case, the packet data is not removed from this output buffer 554 until references to the packet data have cleared their respective queues.

Figure 5B:
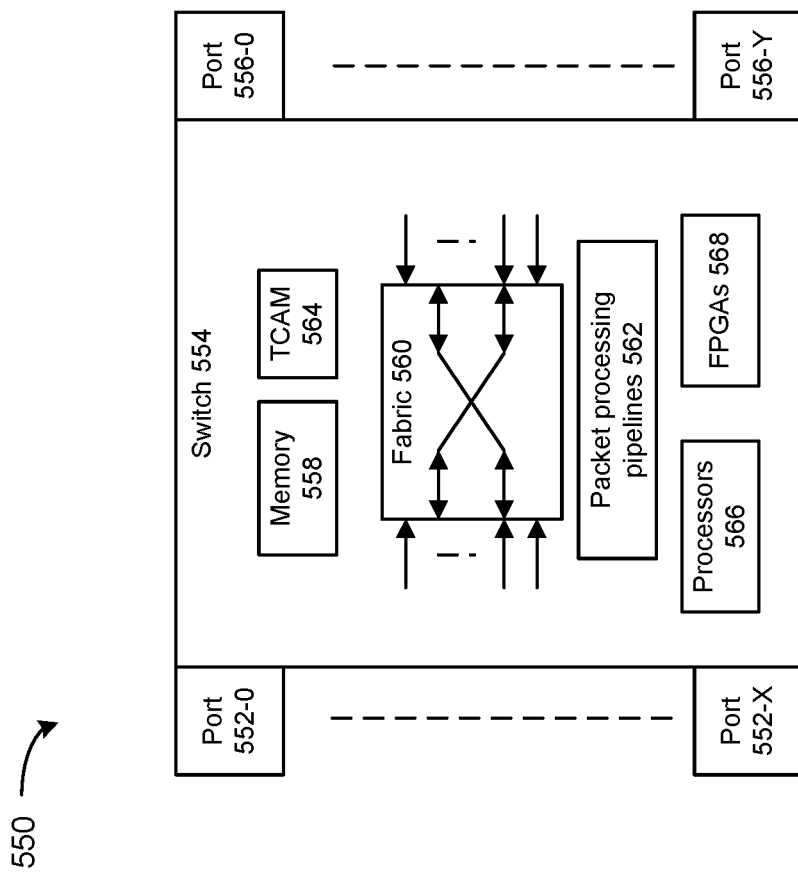
FIG. 5B depicts an example switch.

FIG. 5B depicts an example switch. Examples of switch 550 can schedule packets for transmission using a binary tree, as described herein. Components of switch 554 can be implemented as a system on chip (SoC) in some examples. In some examples, components of switch 554 can be communicatively coupled using a motherboard. Switch 554 can route packets or frames of any format or in accordance with any specification from any port 552-0 to 552-X to any of ports 556-0 to 556-Y (or vice versa). Any of ports 552-0 to 552-X can be connected to a network of one or more interconnected devices. Similarly, any of ports 556-0 to 556-Y can be connected to a network of one or more interconnected devices.

In some examples, switch fabric 560 can provide routing of packets from one or more ingress ports for processing prior to egress from switch 554. Switch fabric 550 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 558 can be configured to store packets received at ports prior to egress from one or more ports. Packet processing pipelines 562 can determine which port to transfer packets or frames to using a table that maps packet characteristics with an associated output port. Packet processing pipelines 562 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 562 can implement access control list (ACL) or packet drops due to queue overflow. Packet processing pipelines 562 can schedule packets for transmission using a binary tree, as described herein, as described herein.

Configuration of operation of packet processing pipelines 562, including its data plane, can be programmed using APIs, configuration files, or programming languages described herein. Processors 566 and FPGAs 568 can be utilized for packet processing or modification or schedule packets for transmission using a binary tree.

Figure 6:
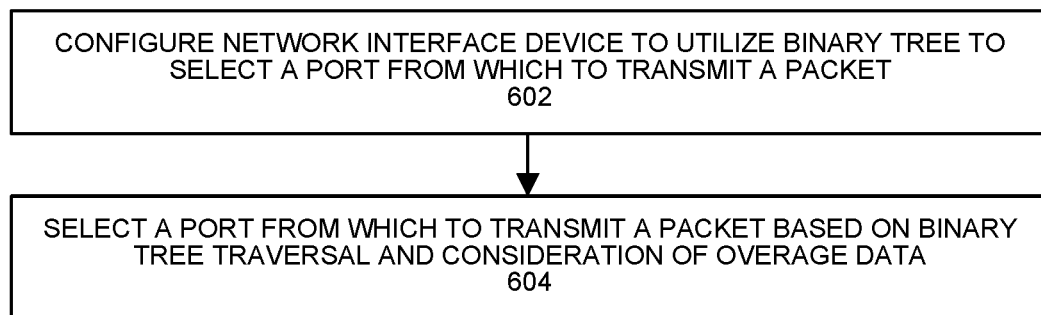
FIG. 6 depicts an example process.

FIG. 6 depicts an example process that can performed at a network interface device. At 602, a network interface device can be configured to select a port from which to transmit a packet based on a binary tree structure. The binary tree structure can be implemented using overage values representing a number of excess bytes transmitted in a left or right child node during one or more prior transmit windows. A feedforward architecture can be used to convey overage values from parent to children to be used to decide which child to select as a port.

At 604, based on identification of a packet to transmit, the network interface device can select a port from which to transmit a packet based on traversal of a binary tree with one or more levels of parent and child nodes. Selection of a child node can be based selecting a child node that is not associated with an overage of bytes allocated for transmission in a prior transmit window.

Figure 7:
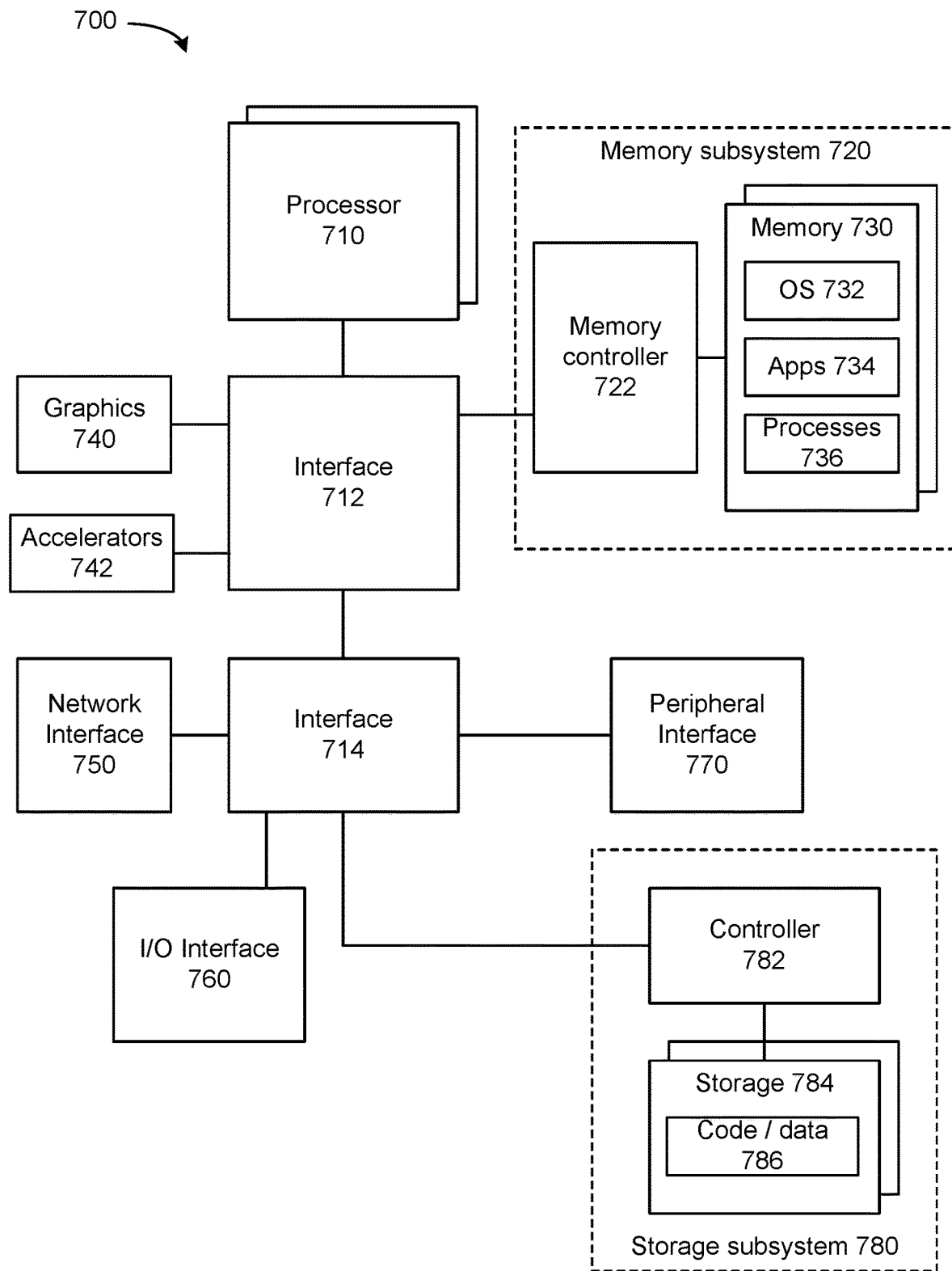
FIG. 7 depicts an example system.

FIG. 7 depicts an example computing system. Components of system 700 (e.g., processor 710, network interface 750, and so forth) to schedule packets for transmission using a binary tree, as described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 70 PPI (pixels per inch) or greater and can include formats such as full HD (e.g., 780p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some examples, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface

712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 750 to schedule packets for transmission using a binary tree, as described herein.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A non-volatile memory (NVM) device is a memory whose state is determinate even if power is interrupted to the device.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same examples or example. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An example of the devices, systems, and methods may include any one or more, and any combination of, the examples described below.

Example 1 includes one or more examples, and includes at least one computer-readable medium, comprising instructions stored thereon, that if executed by at least one processor, cause the at least one processor to: configure a programmable packet processing pipeline of a network interface device to determine a path to transmit a packet based on relative network traffic transmitted via multiple paths.

Example 2 includes one or more examples, wherein the determine a path to transmit a packet based on relative network traffic transmitted via multiple paths is based on prior traffic amount through one or more of the multiple paths.

Example 3 includes one or more examples, wherein the programmable packet processing pipeline includes: a first stage to manage two or more paths, wherein a path of the two or more paths of the first stage is associated with two or more child nodes, a second stage to manage two or more paths, wherein a path of the two or more paths of the second stage is associated with two or more child nodes, and at least one child node is associated with the determined path.

Example 4 includes one or more examples, wherein: the first stage is to manage transmit overage for a first group of two or more child nodes, the second stage to manage transmit overage for a second group of two or more child nodes, and the first group includes the second group but the second group does not include all nodes of the first group.

Example 5 includes one or more examples, wherein the programmable packet processing pipeline is programmable by one or more of: Programming Protocol-independent Packet Processors (P4), C, Python, Broadcom Network Programming Language (NPL), or an executable binary.

Example 6 includes one or more examples, wherein the programmable packet processing pipeline is to maintain byte transmission count using a power of 2 tree data structure that stores packet byte overage associated with two paths, wherein one of the two paths comprises two or more child nodes.

Example 7 includes one or more examples, wherein the network interface device comprises one or more of: network interface controller (NIC), SmartNIC, router, switch, forwarding element, infrastructure processing unit (IPU), data processing unit (DPU), or Compute Express Link (CXL) switch.

Example 8 includes one or more examples, and includes an apparatus comprising: a network interface device comprising a multi-stage programmable packet processing pipeline circuitry to determine a path to transmit a packet based on relative network traffic transmitted via multiple paths.

Example 9 includes one or more examples, wherein the determine a path to transmit a packet is based on Deficit Round Robin (DRR).

Example 10 includes one or more examples, wherein the programmable packet processing pipeline circuitry includes: a first stage to manage two or more paths, wherein a path of the two or more paths of the first stage is associated with two or more child nodes, a second stage to manage two or more paths, wherein a path of the two or more paths of the second stage is associated with two or more child nodes, and at least one child node is associated with the determined path.

Example 11 includes one or more examples, wherein the first stage is to manage transmit overage for a first group of two or more child nodes, the second stage to manage transmit overage for a second group of two or more child nodes, and the first group includes the second group but the second group does not include all nodes of the first group.

Example 12 includes one or more examples, wherein the multi-stage programmable packet processing pipeline circuitry is programmable by one or more of: Programming Protocol-independent Packet Processors (P4), C, Python, Broadcom Network Programming Language (NPL), or an executable binary.

Example 13 includes one or more examples, wherein the relative network traffic transmitted via multiple paths is based on data structure that stores packet byte overage associated with two paths, wherein one of the two paths comprises two or more child nodes.

Example 14 includes one or more examples, wherein the network interface device comprises one or more of: network interface controller (NIC), SmartNIC, router, switch, forwarding element, infrastructure processing unit (IPU), data processing unit (DPU), or Compute Express Link (CXL) switch.

Example 15 includes one or more examples, comprising a server to cause the network interface device to transmit the packet.

Example 16 includes one or more examples, comprising a datacenter that includes the server, wherein the path comprises a port and the port is to transmit the packet to another server in the datacenter.

Example 17 includes one or more examples, and includes a method comprising: determining, by a programmable packet processing pipeline, a path to transmit a packet based on relative network traffic transmitted via multiple paths.

Example 18 includes one or more examples, wherein the programmable packet processing pipeline includes: a first stage to manage two or more paths, wherein a path of the two or more paths of the first stage is associated with two or more child nodes, a second stage to manage two or more paths, wherein a path of the two or more paths of the second stage is associated with two or more child nodes, and at least one child node is associated with the determined path.

Example 19 includes one or more examples, comprising: programming the programmable packet processing pipeline by one or more of: Programming Protocol-independent Packet Processors (P4), C, Python, Broadcom Network Programming Language (NPL), or an executable binary.

Example 20 includes one or more examples, wherein the relative network traffic transmitted via multiple paths is based on data structure that stores packet byte overage associated with two paths, wherein one of the two paths comprises two or more child nodes.

What is claimed is:

1. An apparatus to be used in association with a network switch, the network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the apparatus comprising:

communication circuitry to communicate Ethernet frame data via the network links; and other circuitry to:
based, at least in part, upon a size of an Ethernet frame, schedule one or more equal portions of the Ethernet frame for transmission via one or more of the network links; and
select the one or more of the network links for the transmission so as to evenly distribute the one or more equal portions of the Ethernet frame across one or more of the network paths associated with the one or more of the network links;

wherein:
the transmission is to be via the communication circuitry;
the network switch comprises ports;
the ports are associated with the network links;
the apparatus is configurable for use in:
the at least one leaf/spine infrastructure; and
communication via the at least one fabric; and
in event that the size of the Ethernet frame is greater than a certain number of bytes:
the one or more equal portions comprise multiple equal portions of the Ethernet frame;
the one or more of the network links comprises multiple of the network links; and
the other circuitry is to schedule the transmission of the multiple equal portions of the Ethernet frame and to select the multiple of the network links so as to evenly distribute the multiple equal portions of the Ethernet frame across multiple of the network paths associated with the multiple of the network links.

2. The apparatus of claim 1, wherein:
the at least one GPU is to be used in carrying out artificial intelligence (AI) and/or machine learning (ML) operations.

3. The apparatus of claim 2, wherein:
the size of the Ethernet frame is greater than the certain number of bytes.

4. The apparatus of claim 3, wherein:
the apparatus is configurable to generate congestion-related data telemetry data; and
the apparatus is comprised in a system-on-chip and/or application specific integrated circuit.

5. A method implemented using an apparatus, the apparatus to be used in association with a network switch, the network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the apparatus comprising communication circuitry and other circuitry, the method comprising:

communicating, via the communication circuitry, Ethernet frame data via the network links;
based, at least in part, upon a size of an Ethernet frame, scheduling, by the other circuitry, one or more equal portions of the Ethernet frame for transmission via one or more of the network links; and
selecting, by the other circuitry, the one or more of the network links for the transmission so as to evenly distribute the one or more equal portions of the Ethernet frame across one or more of the network paths associated with the one or more of the network links;

wherein:
the transmission is to be via the communication circuitry;
the network switch comprises ports;
the ports are associated with the network links;
the apparatus is configurable for use in:
the at least one leaf/spine infrastructure; and
communication via the at least one fabric; and
in event that the size of the Ethernet frame is greater than a certain number of bytes:
the one or more equal portions comprise multiple equal portions of the Ethernet frame;
the one or more of the network links comprises multiple of the network links; and
the other circuitry is to schedule the transmission of the multiple equal portions of the Ethernet frame and to select the multiple of the network links so as to evenly distribute the multiple equal portions of the Ethernet frame across multiple of the network paths associated with the multiple of the network links.

6. The method of claim 5, wherein:
the at least one GPU is to be used in carrying out artificial intelligence (AI) and/or machine learning (ML) operations.

7. The method of claim 6, wherein:
the size of the Ethernet frame is greater than the certain number of bytes.

8. The method of claim 7, wherein:
the apparatus is configurable to generate congestion-related data telemetry data; and
the apparatus is comprised in a system-on-chip and/or application specific integrated circuit.

9. At least one non-transitory machine-readable medium storing instructions to be executed by at least one machine, the at least one machine to be used in association with a network switch, the network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the at least one machine comprising communication circuitry and other circuitry, the instructions when executed by the at least one machine, resulting in performance of operations comprising:

communicating, via the communication circuitry, Ethernet frame data via the network links;

based, at least in part, upon a size of an Ethernet frame, scheduling, by the other circuitry, one or more equal portions of the Ethernet frame for transmission via one or more of the network links; and selecting, by the other circuitry, the one or more of the network links for the transmission so as to evenly distribute the one or more equal portions of the Ethernet frame across one or more of the network paths associated with the one or more of the network links;

wherein:
the transmission is to be via the communication circuitry;
the network switch comprises ports;
the ports are associated with the network links;
the at least one machine is configurable for use in:
the at least one leaf/spine infrastructure; and
communication via the at least one fabric; and
in event that the size of the Ethernet frame is greater than a certain number of bytes:
the one or more equal portions comprise multiple equal portions of the Ethernet frame;
the one or more of the network links comprises multiple of the network links; and
the other circuitry is to schedule the transmission of the multiple equal portions of the Ethernet frame and to select the multiple of the network links so as to evenly distribute the multiple equal portions of the Ethernet frame across multiple of the network paths associated with the multiple of the network links.

10. The at least one non-transitory machine-readable medium of claim 9, wherein:
the at least one GPU is to be used in carrying out artificial intelligence (AI) and/or machine learning (ML) operations.

11. The at least one non-transitory machine-readable medium of claim 10, wherein:
the size of the Ethernet frame is greater than the certain number of bytes.

12. The at least one non-transitory machine-readable medium of claim 11, wherein:
the at least one machine is configurable to generate congestion-related data telemetry data; and
the at least one machine is comprised in a system-on-chip and/or application specific integrated circuit.

13. A network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the network switch comprising:
ports to be associated with the network links; and
at least one machine comprising:
communication circuitry to communicate Ethernet frame data via the ports and the network links; and
other circuitry to:
based, at least in part, upon a size of an Ethernet frame, schedule one or more equal portions of the Ethernet frame for transmission via one or more of the network links; and
select the one or more of the network links for the transmission so as to evenly distribute the one or more equal portions of the Ethernet frame across one or more of the network paths associated with the one or more of the network links;

wherein:
the transmission is to be via the communication circuitry;
the network switch is configurable for use in:
the at least one leaf/spine infrastructure; and
communication via the at least one fabric; and
in event that the size of the Ethernet frame is greater than a certain number of bytes:
the one or more equal portions comprise multiple equal portions of the Ethernet frame;
the one or more of the network links comprises multiple of the network links; and
the other circuitry is to schedule the transmission of the multiple equal portions of the Ethernet frame and to select the multiple of the network links so as to evenly distribute the multiple equal portions of the Ethernet frame across multiple of the network paths associated with the multiple of the network links.

14. The network switch of claim 13, wherein:
the at least one GPU is to be used in carrying out artificial intelligence (AI) and/or machine learning (ML) operations.

15. The network switch of claim 14, wherein:
the size of the Ethernet frame is greater than the certain number of bytes.

16. The network switch of claim 15, wherein:
the network switch is configurable to generate congestion-related data telemetry data; and
the network switch is comprised in a system-on-chip and/or application specific integrated circuit.

17. A data center to be used in association with at least one network, the data center comprising:
at least one graphics processing unit (GPU);
at least one fabric;
at least one leaf/spine infrastructure; and
a network switch to be communicatively coupled via network links to the at least one network, the network switch to be used in association with the at the at least one GPU, the network switch being comprised in the at least one leaf/spine infrastructure, the network switch being configured for communication via the at least one fabric, the network links to be associated with network paths in the at least one network, the network switch comprising:
ports to be associated with the network links; and
at least one machine comprising:
communication circuitry to communicate Ethernet frame data via the ports and the network links; and
other circuitry to:
based, at least in part, upon a size of an Ethernet frame, schedule one or more equal portions of the Ethernet frame for transmission via one or more of the network links; and
select the one or more of the network links for the transmission so as to evenly distribute the one or more equal portions of the Ethernet frame across one or more of the network paths associated with the one or more of the network links;

wherein:
the transmission is to be via the communication circuitry; and
in event that the size of the Ethernet frame is greater than a certain number of bytes;

the one or more equal portions comprise multiple equal portions of the Ethernet frame;

the one or more of the network links comprises multiple of the network links; and the other circuitry is to schedule the transmission of the multiple equal portions of the Ethernet frame and to select the multiple of the network links so as to evenly distribute the multiple equal portions of the Ethernet frame across multiple of the network paths associated with the multiple of the network links.

18. The data center of claim 17, wherein:
the at least one GPU is to be used in carrying out artificial intelligence (AI) and/or machine learning (ML) operations.

19. The data center of claim 18, wherein:
the size of the Ethernet frame is greater than the certain number of bytes.

20. The data center of claim 19, wherein:
the network switch is configurable to generate congestion-related data telemetry data; and
the network switch is comprised in a system-on-chip and/or application specific integrated circuit.

21. An apparatus to be used in association with a network switch, the network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the apparatus comprising:

communication interface device for communicating Ethernet frame data via the network links;

a scheduling device for scheduling, based, at least in part, upon a size of an Ethernet frame, one or more equal portions of the Ethernet frame for transmission via one or more of the network links; and a selecting device for selecting the one or more of the network links for the transmission so as to evenly distribute the one or more equal portions of the Ethernet frame across one or more of the network paths associated with the one or more of the network links;

wherein:
the transmission is to be via the communication interface device;
the network switch comprises ports;
the ports are associated with the network links;
the apparatus is configurable for use in:
the at least one leaf/spine infrastructure; and
communication via the at least one fabric; and
in event that the size of the Ethernet frame is greater than a certain number of bytes:
the one or more equal portions comprise multiple equal portions of the Ethernet frame;
the one or more of the network links comprises multiple of the network links; and
the scheduling device is for scheduling the transmission of the multiple equal portions of the Ethernet frame, and the selecting device is for selecting the multiple of the network links so as to evenly distribute the multiple equal portions of the Ethernet frame across multiple of the network paths associated with the multiple of the network links.

22. The apparatus of claim 21, wherein:
the at least one GPU is to be used in carrying out artificial intelligence (AI) and/or machine learning (ML) operations.

23. The apparatus of claim 22, wherein:
the size of the Ethernet frame is greater than the certain number of bytes.

24. The apparatus of claim 23, wherein:
the apparatus is configurable to generate congestion-related data telemetry data; and
the apparatus is comprised in a system-on-chip and/or application specific integrated circuit.

25. An apparatus to be used in association with a network switch, the network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the apparatus comprising:

communication circuitry to communicate Ethernet frame data via the network links; and other circuitry to:
based, at least in part, upon (1) an allocated size of egress Ethernet frame data to one or more of the network paths associated with one or more of the network links, and (2) one or more sizes of one or more Ethernet frames that are to be associated with the egress Ethernet frame data:
schedule, in accordance with the allocated size, one or more portions of the one or more Ethernet frames for transmission via the one or more of the network links; and
select the one or more of the network links for the transmission so as to evenly distribute egress Ethernet frame data bandwidth across the one or more of the network paths;

wherein:
the transmission is to be via the communication circuitry;
the network switch comprises ports;
the ports are associated with the network links;
the apparatus is configurable for use in:
the at least one leaf/spine infrastructure; and
communication via the at least one fabric; and
in event that the one or more sizes of the one or more egress Ethernet frames are greater than a certain number of bytes:
the one or more portions comprise multiple equal portions of the one or more egress Ethernet frames;
the one or more of the network links comprise multiple of the network links; and
the other circuitry is to schedule the transmission of the multiple equal portions of the one or more egress Ethernet frames and to select the multiple of the network links so as to evenly distribute the multiple equal portions of the one or more Ethernet frames across multiple of the network paths associated with the multiple of the network links.

26. The apparatus of claim 25, wherein:
the at least one GPU is to be used in carrying out artificial intelligence (AI) and/or machine learning (ML) operations.

27. The apparatus of claim 26, wherein:
the one or more sizes of the one or more egress Ethernet frames are greater than the certain number of bytes.

28. The apparatus of claim 27, wherein:
the apparatus is configurable to generate congestion-related data telemetry data; and
the apparatus is comprised in a system-on-chip and/or application specific integrated circuit.

29. A method implemented using an apparatus, the apparatus to be used in association with a network switch, the network switch to be communicatively coupled via network links to at least one network, the apparatus comprising communication circuitry and other circuitry, the network switch being configurable for use in association with at least one graphics processing unit (GPU), the network links to be associated with network paths in the at least one network, the at least one network being configurable to include at least one fabric and at least one leaf/spine infrastructure, the method comprising:
communicating, via the communication circuitry, Ethernet frame data via the network links; and
based, at least in part, upon (1) an allocated size of egress Ethernet frame data to one or more of the network paths associated with one or more of the network links, and (2) one or more sizes of one or more Ethernet frames that are to be associated with the egress Ethernet frame data:
scheduling, by the other circuitry, in accordance with the allocated size, one or more portions of the one or more Ethernet frames for transmission via the one or more of the network links; and
selecting, by the other circuitry, the one or more of the network links for the transmission so as to evenly distribute egress Ethernet frame data bandwidth across the one or more of the network paths;
wherein:
the transmission is to be via the communication circuitry;
the network switch comprises ports;
the ports are associated with the network links;
the apparatus is configurable for use in:
the at least one leaf/spine infrastructure; and
communication via the at least one fabric; and
in event that the one or more sizes of the one or more egress Ethernet frames are greater than a certain number of bytes:
the one or more portions comprise multiple equal portions of the one or more egress Ethernet frames;
the one or more of the network links comprise multiple of the network links; and
the other circuitry is to schedule the transmission of the multiple equal portions of the one or more egress Ethernet frames and to select the multiple of the network links so as to evenly distribute the multiple equal portions of the one or more Ethernet frames across multiple of the network paths associated with the multiple of the network links.

30. The method of claim 29, wherein:
the at least one GPU is to be used in carrying out artificial intelligence (AI) and/or machine learning (ML) operations.

31. The method of claim 30, wherein:
the one or more sizes of the one or more egress Ethernet frames are greater than the certain number of bytes.

32. The method of claim 31, wherein:
the apparatus is configurable to generate congestion-related data telemetry data; and
the apparatus is comprised in a system-on-chip and/or application specific integrated circuit.

33. At least one non-transitory machine-readable medium storing instructions to be executed by at least one machine, the at least one machine to be used in association with a network switch, the network switch to be communicatively coupled via network links to at least one network, the at least one machine comprising communication circuitry and other circuitry, the network switch being configurable for use in association with at least one graphics processing unit (GPU), the network links to be associated with network paths in the at least one network, the at least one network being configurable to include at least one fabric and at least one leaf/spine infrastructure, the instructions, when executed by the at least one machine, resulting in performance of operations comprising:
communicating, via the communication circuitry, Ethernet frame data via the network links; and
based, at least in part, upon (1) an allocated size of egress Ethernet frame data to one or more of the network paths associated with one or more of the network links, and (2) one or more sizes of one or more Ethernet frames that are to be associated with the egress Ethernet frame data:
scheduling, by the other circuitry, in accordance with the allocated size, one or more portions of the one or more Ethernet frames for transmission via the one or more of the network links; and
selecting, by the other circuitry, the one or more of the network links for the transmission so as to evenly distribute egress Ethernet frame data bandwidth across the one or more of the network paths;
wherein:
the transmission is to be via the communication circuitry;
the network switch comprises ports;
the ports are associated with the network links;
the at least one machine is configurable for use in:
the at least one leaf/spine infrastructure; and
communication via the at least one fabric; and
in event that the one or more sizes of the one or more egress Ethernet frames are greater than a certain number of bytes:
the one or more portions comprise multiple equal portions of the one or more egress Ethernet frames;
the one or more of the network links comprise multiple of the network links; and
the other circuitry is to schedule the transmission of the multiple equal portions of the one or more egress Ethernet frames and to select the multiple of the network links so as to evenly distribute the multiple equal portions of the one or more Ethernet frames across multiple of the network paths associated with the multiple of the network links.

34. The at least one non-transitory machine-readable medium of claim 33, wherein:
the at least one GPU is to be used in carrying out artificial intelligence (AI) and/or machine learning (ML) operations.

35. The at least one non-transitory machine-readable medium of claim 34, wherein:
the one or more sizes of the one or more egress Ethernet frames are greater than the certain number of bytes.

36. The at least one non-transitory machine-readable medium of claim 35, wherein:
the at least one machine is configurable to generate congestion-related data telemetry data; and the at least one machine is comprised in a system-on-chip and/or application specific integrated circuit.

37. A network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the network switch comprising:
ports to be associated with the network links; and
at least one machine comprising:
communication circuitry to communicate Ethernet frame data via the network links; and
other circuitry to:
based, at least in part, upon (1) an allocated size of egress Ethernet frame data to one or more of the network paths associated with one or more of the network links, and (2) one or more sizes of one or more Ethernet frames that are to be associated with the egress Ethernet frame data:
schedule, in accordance with the allocated size, one or more portions of the one or more Ethernet frames for transmission via the one or more of the network links; and
select the one or more of the network links for the transmission so as to evenly distribute egress Ethernet frame data bandwidth across the one or more of the network paths;
wherein:
the transmission is to be via the communication circuitry;
the at least one machine is configurable for use in:
the at least one leaf/spine infrastructure; and
communication via the at least one fabric; and
in event that the one or more sizes of the one or more egress Ethernet frames are greater than a certain number of bytes:
the one or more portions comprise multiple equal portions of the one or more egress Ethernet frames;
the one or more of the network links comprise multiple of the network links; and
the other circuitry is to schedule the transmission of the multiple equal portions of the one or more egress Ethernet frames and to select the multiple of the network links so as to evenly distribute the multiple equal portions of the one or more Ethernet frames across multiple of the network paths associated with the multiple of the network links.

38. The network switch of claim 37, wherein:
the at least one GPU is to be used in carrying out artificial intelligence (AI) and/or machine learning (ML) operations.

39. The network switch of claim 38, wherein:
the one or more sizes of the one or more egress Ethernet frames are greater than the certain number of bytes.

40. The network switch of claim 39, wherein:
the network switch is configurable to generate congestion-related data telemetry data; and
the network switch is comprised in a system-on-chip and/or application specific integrated circuit.

41. A data center to be used in association with at least one network, the data center comprising:
at least one graphics processing unit (GPU);
at least one fabric;
at least one leaf/spine infrastructure; and
a network switch to be communicatively coupled via network links to the at least one network, the network switch to be used in association with the at the at least one GPU, the network switch being comprised in the at least one leaf/spine infrastructure, the network switch being configured for communication via the at least one fabric, the network links to be associated with network paths in the at least one network, the network switch comprising:
ports to be associated with the network links; and
at least one machine comprising:
communication circuitry to communicate Ethernet frame data via the network links; and
other circuitry to:
based, at least in part, upon (1) an allocated size of egress Ethernet frame data to one or more of the network paths associated with one or more of the network links, and (2) one or more sizes of one or more Ethernet frames that are to be associated with the egress Ethernet frame data:
schedule, in accordance with the allocated size, one or more portions of the one or more Ethernet frames for transmission via the one or more of the network links; and
select the one or more of the network links for the transmission so as to evenly distribute egress Ethernet frame data bandwidth across the one or more of the network paths;
wherein:
the transmission is to be via the communication circuitry;
the at least one machine is configurable for use in:
the at least one leaf/spine infrastructure; and
communication via the at least one fabric; and
in event that the one or more sizes of the one or more egress Ethernet frames are greater than a certain number of bytes:
the one or more portions comprise multiple equal portions of the one or more egress Ethernet frames;
the one or more of the network links comprise multiple of the network links; and
the other circuitry is to schedule the transmission of the multiple equal portions of the one or more egress Ethernet frames and to select the multiple of the network links so as to evenly distribute the multiple equal portions of the one or more Ethernet frames across multiple of the network paths associated with the multiple of the network links.

42. The data center of claim 41, wherein:
the at least one GPU is to be used in carrying out artificial intelligence (AI) and/or machine learning (ML) operations.

43. The data center of claim 42, wherein:
the one or more sizes of the one or more egress Ethernet frames are greater than the certain number of bytes.

44. The data center of claim 43, wherein:
the network switch is configurable to generate congestion-related data telemetry data; and
the network switch is comprised in a system-on-chip and/or application specific integrated circuit.

45. An apparatus to be used in association with a network switch, the network switch to be communicatively coupled via network links to at least one network, the network switch being configurable for use in association with at least one graphics processing unit (GPU), the network links to be associated with network paths in the at least one network, the at least one network being configurable to include at least one fabric and at least one leaf/spine infrastructure, the apparatus comprising:
- a communication interface device for communicating Ethernet frame data via the network links;
- a scheduling device for scheduling, based, at least in part, upon (1) an allocated size of egress Ethernet frame data to one or more of the network paths associated with one or more of the network links, and (2) one or more sizes of one or more Ethernet frames that are to be associated with the egress Ethernet frame data, one or more portions of the one or more Ethernet frames for transmission via the one or more of the network links, the scheduling to be in accordance with the allocated size; and
- a selecting device for selecting, based, at least in part, upon (1) the allocated size of egress Ethernet frame data, and (2) the one or more sizes of one or more Ethernet frames, the one or more of the network links for the transmission so as to evenly distribute egress Ethernet frame data bandwidth across the one or more of the network paths;

wherein:
- the transmission is to be via the communication interface device;
- the network switch comprises ports;
- the ports are associated with the network links;
- the apparatus is configurable for use in:
  - the at least one leaf/spine infrastructure; and
  - communication via the at least one fabric; and
- in event that the one or more sizes of the one or more egress Ethernet frames are greater than a certain number of bytes:
  - the one or more portions comprise multiple equal portions of the one or more egress Ethernet frames;
  - the one or more of the network links comprise multiple of the network links; and
  - the scheduling device is for scheduling the transmission of the multiple equal portions of the one or more egress Ethernet frames and to select the multiple of the network links so as to evenly distribute the multiple equal portions of the one or more Ethernet frames across multiple of the network paths associated with the multiple of the network links.

46. The apparatus of claim 45, wherein:
the at least one GPU is to be used in carrying out artificial intelligence (AI) and/or machine learning (ML) operations.

47. The apparatus of claim 46, wherein:
the one or more sizes of the one or more egress Ethernet frames are greater than the certain number of bytes.

48. The apparatus of claim 47, wherein:
the apparatus is configurable to generate congestion-related data telemetry data; and
the apparatus is comprised in a system-on-chip and/or application specific integrated circuit.

* * * * *